(12) United States Patent
Gupta et al.

(10) Patent No.: US 12,068,921 B2
(45) Date of Patent: Aug. 20, 2024

(54) METHOD AND SYSTEM FOR EDGE DATA NETWORK (EDN) LIFECYCLE MANAGEMENT

(71) Applicant: Samsung Electronics Co., Ltd., Suwon-si (KR)

(72) Inventors: Nishant Gupta, Bangalore (IN); Deepanshu Gautam, Bangalore (IN); Walter Featherstone, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 18/003,304

(22) PCT Filed: Jun. 25, 2021

(86) PCT No.: PCT/KR2021/008043
§ 371 (c)(1),
(2) Date: Dec. 23, 2022

(87) PCT Pub. No.: WO2021/261964
PCT Pub. Date: Dec. 30, 2021

(65) Prior Publication Data
US 2023/0254215 A1   Aug. 10, 2023

(30) Foreign Application Priority Data

Jun. 26, 2020 (IN) .............................. 202041027199
Jun. 21, 2021 (IN) .............................. 202041027199

(51) Int. Cl.
*H04L 41/0895* (2022.01)
*H04L 41/40* (2022.01)

(52) U.S. Cl.
CPC .......... *H04L 41/0895* (2022.05); *H04L 41/40* (2022.05)

(58) Field of Classification Search
CPC ..... H04L 41/12; H04L 41/0895; H04L 41/40; H04L 41/342; H04L 41/5051;
(Continued)

(56) References Cited

U.S. PATENT DOCUMENTS

2019/0266012 A1   8/2019   Chou
2020/0021487 A1   1/2020   Yao et al.
(Continued)

FOREIGN PATENT DOCUMENTS

EP   3437254 A1      2/2019
WO   2017171904 A1  10/2017

OTHER PUBLICATIONS

TS23.758, "3GPP TR 23.758 v17.0.0(Dec. 2019), 3rd Generation Partnership Project; Technical Specification Group Services and System Aspects; Study on application architecture for enabling Edge Applications; (Release 17), edited Dec. 2019" (Year: 2019).*
(Continued)

*Primary Examiner* — Oscar A Louie
*Assistant Examiner* — Messeret F Gebre

(57) ABSTRACT

In embodiments of the present disclosure, a method for deploying an Edge Device Network (EDN) is provided. The method comprises: receiving, by an Edge Computing Management Service Provider (ECMSP), an Edge Data Network (EDN) deployment request for creating an EDN instance associated with an EDNFunction class, wherein the EDN deployment request comprises one or more requirements associated with the EDN; identifying an EDNfunction Information Object Class (IOC) based on the one or more requirements included in the EDN deployment request; and deploying the EDN based on the identified EDNfunction IOC and the one or more requirements.

14 Claims, 4 Drawing Sheets

(58) Field of Classification Search
CPC ........... H04L 67/12; G06N 20/00; G06F 8/60; G06F 2009/45562
See application file for complete search history.

(56) References Cited

U.S. PATENT DOCUMENTS

2020/0044919 A1* 2/2020 Yao ..................... H04L 41/0806
2022/0007219 A1* 1/2022 Ping ..................... H04W 24/08

OTHER PUBLICATIONS

L. Yala, P. A. Frangoudis and A. Ksentini, "Latency and Availability Driven VNF Placement in a MEC-NFV Environment," 2018 IEEE Global Communications Conference (GLOBECOM), Abu Dhabi, United Arab Emirates, 2018, pp. 1-7 (Year: 2018).*

Sarrigiannis, I., Kartsakli, E., Ramantas, K., Antonopoulos, A., & Verikoukis, C. (2018). Application and network VNF migration in a MEC-enabled 5G architecture doi:http://dx.doi.org/10.1109/CAMAD.2018.8514943 (2018) (Year: 2018).*

R. Bruschi, R. Bolla, F. Davoli, A. Zafeiropoulos and P. Gouvas, "Mobile Edge Vertical Computing over 5G Network Sliced Infrastructures: An Insight into Integration Approaches," in IEEE Communications Magazine, vol. 57, No. 7, pp. 78-84, Jul. 2019 (Year: 2019).*

International Search Report and Written Opinion of the International Searching Authority dated Oct. 31, 2021, in connection with International Application No. PCT/KR2021/008043, 7 pages.

3GPP TS 28.532 V16.3.0 (Mar. 2020), Technical Specification, 3rd Generation Partnership Project; Technical Specification Group Services and System Aspects; Management and orchestration; Generic management services; (Release 16), Mar. 2020, 230 pages.

3GPP TS 28.550 V16.4.0 (Mar. 2020), Technical Specification, 3rd Generation Partnership Project; Technical Specification Group Services and System Aspects; Management and orchestration; Performance assurance (Release 16), Mar. 2020, 114 pages.

3GPP TS 23.558 V0.3.0 (Jun. 2020), Technical Specification, 3rd Generation Partnership Project; Technical Specification Group Services and System Aspects; Architecture for enabling Edge Applications; (Release 17), Jun. 2020, 70 pages.

Examination report dated Jun. 3, 2022, in connection with Indian Application No. 202041027199, 6 pages.

* cited by examiner

METHOD AND SYSTEM FOR EDGE DATA NETWORK (EDN) LIFECYCLE MANAGEMENT

CROSS-REFERENCE TO RELATED APPLICATIONS

This application is a 371 National Stage of International Application No. PCT/KR2021/008043, filed Jun. 25, 2021, which claims priority to Indian Patent Application No. 202041027199, filed Jun. 26, 2020, and Indian Patent Application No. 202041027199, filed Jun. 21, 2021, the disclosures of which are herein incorporated by reference in their entirety.

BACKGROUND

1. Field

The present disclosure relates to methods and systems for managing the lifecycle of Edge Data Network (EDN). In particular, the present disclosure relates to a method and system for deploying the Edge Device Network (EDN).

2. Description of Related Art

Fifth Generation (5G) system consists of 5G Access Network (AN), 5G Core Network and user equipment (UE). 5G system is expected to be able to provide optimized support for a variety of different communication services, different traffic loads, and different end user communities. For example, the communication services using network slicing may include Vehicle to Everything (V2X) services where the 5G system aims to enhance its capability to meet Key Performance Indicator (KPIs) that emerging V2X applications require. For the advanced applications, the requirements, such as data rate, reliability, latency, communication range and speed, are made more stringent. Furthermore, 5G seamless Enhanced Mobile Broadband (eMBB) is one of the key technologies to enable network slicing, fixed mobile convergence (FMC) which includes wireless-to-the-everything (WTTx) and fibre-to-the-everything (FTTx). The 5G seamless eMBB technology is expected to provide native support for network slicing. For optimization and resource efficiency, the 5G system will select the most appropriate 3rd Generation Partnership Project (3GPP) or non-3GPP access technology for a communication service, potentially allowing multiple access technologies to be used simultaneously for one or more services active on a UE, massive Internet of Things (IoT) connections. The support for massive Internet of Things (mIoT) brings many new requirements in addition to MBB enhancements. Communication services with massive IoT connections such as smart households, smart grid, smart agriculture and smart meter will require the support of a large number and high-density IoT devices to be efficient and cost effective. Operators can use one or more network slice instances to provide these communication services, which require similar network characteristics, to different vertical industries. 3GPP TS 28.530 and 28.531 defines the management of Network Slice in 5G networks. It also defined the concept of Communication Services, which are provided using one or multiple Network Slice. A Network Slice Instance (NSI) may support multiple Communication Service Instances (CSIs) and similarly, a CSI may utilize multiple NSIs.

Further, 3GPP SA6 is working on an architecture for enabling edge computing (3GPP TS 23.558), which specifies an application framework or an enabling layer platform to support Edge Computing in 3GPP specified networks, (e.g. discovery of edge services, authentication of the clients). The work includes the interactions between the UE and the enabling layer platform, and the interactions between the applications deployed over edge and the enabling layer platform. Further, the work is to facilitate integration with the underlying 3GPP core network. The work defines Edge Application Server (EAS) or Edge Application as a piece of software running and deployed on virtual infrastructure at the edge of the 3GPP network.

SUMMARY

The lifecycle management of EDN is considered to be a crucial management aspect. The present disclosure therefore solves one or more problem prevalent in the conventional art.

In an embodiment of the present disclosure, a method for deploying an Edge Device Network (EDN) is provided. The method comprises: receiving, by an Edge Computing Management Service Provider (ECMSP), an Edge Data Network (EDN) deployment request for creating an EDN instance associated with an EDNFunction class, wherein the EDN deployment request comprises one or more requirements associated with the EDN; identifying an EDNfunction Information Object Class (IOC) based on the one or more requirements included in the EDN deployment request; and deploying the EDN based on the identified EDNfunction IOC and the one or more requirements.

In another embodiment of the present disclosure, the first network node for deploying an Edge Device Network (EDN) is provided. The first network node comprises: a memory; and a processor coupled to the memory, wherein the processor is configured to: receive by an Edge Computing Management Service Provider (ECMSP), an Edge Data Network (EDN) deployment request for creating an EDN instance associated with an EDNFunction class from a second network node, wherein the EDN deployment request comprises one or more requirements associated with the EDN; identify an EDNfunction Information Object Class (IOC) based on the one or more requirements included in the EDN deployment request; and deploy the EDN based on the identified EDNfunction IOC and the one or more requirements.

The embodiments of the present disclosure manages the Lifecycle of the Edge components as defined in SA6, specifically the EDN (with its registered EAS(s) and EES(s)) whilst accounting for their associated requirements.

The embodiments of the present disclosure provides 3GPP management system including the capability to provide EDN lifecycle management including (not limited to) instantiation, termination, scaling.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
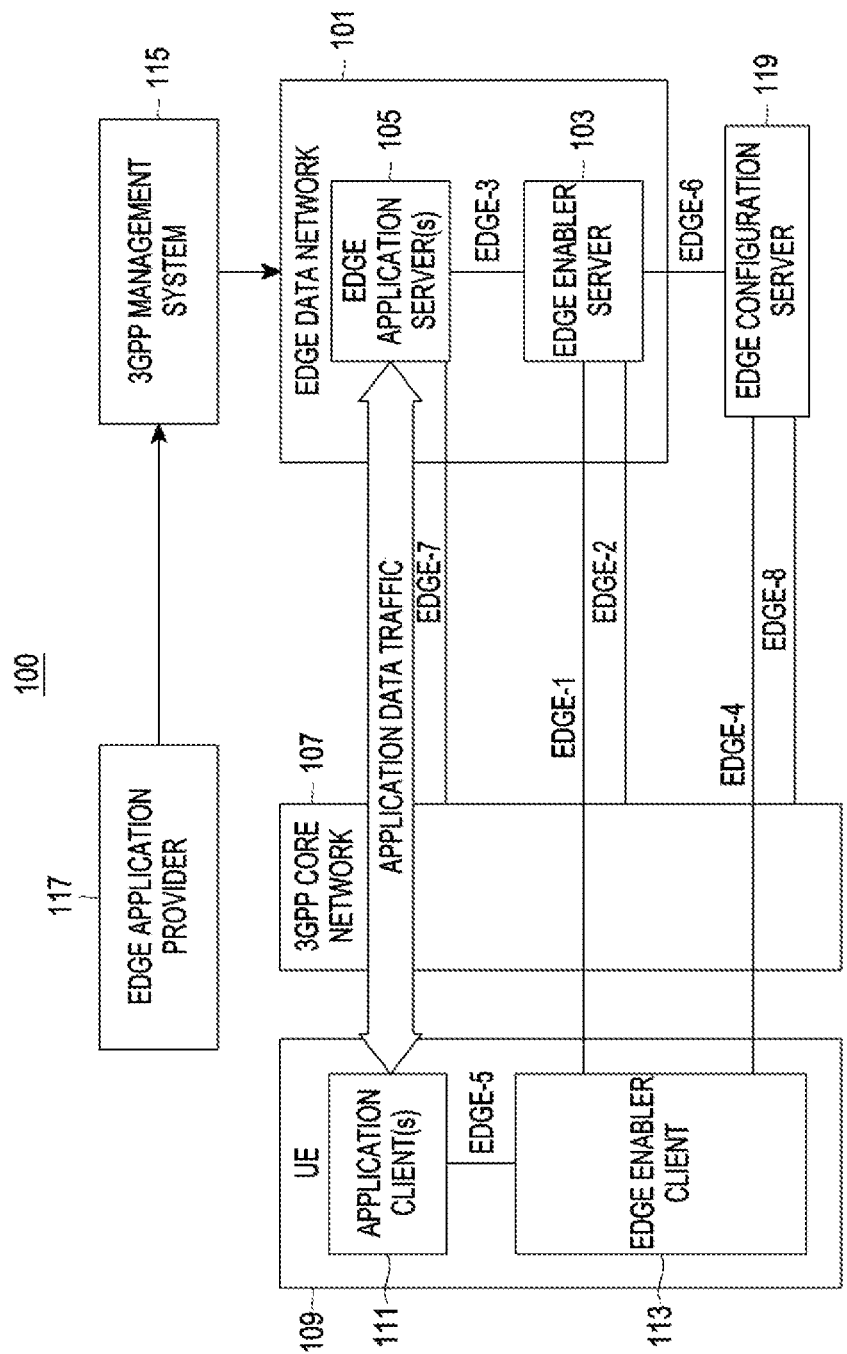
FIG. 1 illustrates a block diagram Application Architecture for Edge Apps (EDGEAPP) 100 for enabling edge computing, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

It will be understood by those skilled in the art that the foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiments.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which the present disclosure belongs. The system, methods, and examples provided herein are illustrative only and not intended to be limiting.

The present disclosure provides a method and system for EDN lifecycle management in wireless communication systems. In particular, an EDN Instance Object Class (IOC) is provided in an EDGE Network Resource Model (NRM). This IOC represents the properties of EDN and includes attributes inherited from SubNetwork IOC (defined in TS 28.622[30]) as defined in the below Table 1:

TABLE 1

| Attribute name | Support Qualifier | Description |
| --- | --- | --- |
| pLMNIdList | M | As defined in TS 28.541 |
| sNSSAIList | O | As defined in TS 28.541 |
| eDNservingLocation | M | This parameter defines the service location for the EDN e.g geometric shape covering an area (long, lat, circle, radius); access network defined (e.g. Cell IDs, Tracking Areas); network defined (e.g. a specific EDN(s)), civic address. |
| virtualResCapInfo | M | The parameter defined the total and available virtual resource capacity available in the EDN. This would contain the virtual compute, storage and network resource capacity. |
| >hostingEnvironment | O | Identifier of the hosting environment such as Edge Hosting Environment or Service Hosting Environment, where the Edge Computing functions (like EES and EAS) are hosted. |
| >>EESFunctionref | O | This will refer to the EESFunction IOC defining the EES(s) available in the hosting environment. |
| >>EASFunctionref | O | This will refer to the EASFunction IOC defining the EAS(s) available in the hosting environment. |
| Attribute related to role | | |
| EESFunctionref | C | This will refer to the EESFunction IOC defining the EES(s) available in the EDN. This holds a DN of EESFunction relating to the EDNFunction instance. Note: This will only be present if "hostingEnvironment" is not present |
| EASFunctionref | C | This will refer to the EASFunction IOC defining the EAS(s) available in the EDN. This holds a DN of EASFunction relating to the EDNFunction instance. Note: This will only be present if "hostingEnvironment" is not present |

FIG. 1 illustrates a block diagram Application Architecture for Edge Apps (EDGEAPP) 100 for enabling edge computing, according to an embodiment of the present disclosure. In general, 3GPP SA6 is working on an architecture for enabling edge computing (3GPP TR 23.558), which specifies an application framework or an enabling layer platform to support Edge Computing in 3GPP specified networks, (e.g. discovery of edge services, authentication of the clients). SA6 has defined EDN 101 consisting of Edge Enabler Server (EES(s)) 103 and the Edge Application Server (EAS) 105. The EDN 101 is a local Data Network that supports the architecture for enabling edge applications. In an example, if needed, EDN 101 can be deployed as Local Area Data Network (LADN). Further, there is an interaction between the UE 109 and the enabling layer platform.

According to an embodiment the EDN 101 interacts between the applications deployed over edge and the enabling layer platform. As shown in the FIG. 1, the EDN 101 is communicatively coupled with the 3GPP core Network 107 and a UE 109. According to an embodiment, the UE 109 further consist of Application Clients(s) 111 and Edge Enabler Client (EEC) 113 that enables discovery of Edge Applications and provisioning of configuration data. The EES 103 provides information related to the Edge Application, such as availability/enablement and related configuration, to the Edge Enabler client 113 and discloses capabilities of 3GPP network 107 to Edge Applications. Further, according to said embodiment, Edge Application Server (EAS) 105 or Edge Application defines as a piece of software running and deployed on virtual infrastructure at the edge of the 3GPP network.

According to the further embodiment an Edge Configuration Server 119 is in communication to the EES 103 and Edge Enabler Client 113. The ECS 119 provides Edge Data Network Configuration information to the Edge Enabler Client 113. The 3GPP Management 115 System configures for managing the lifecycle of EDN 101. The 3GPP management system have the capability to provide EDN 101 lifecycle management including but not limited to instantiation, termination, scaling.

Figure 2:
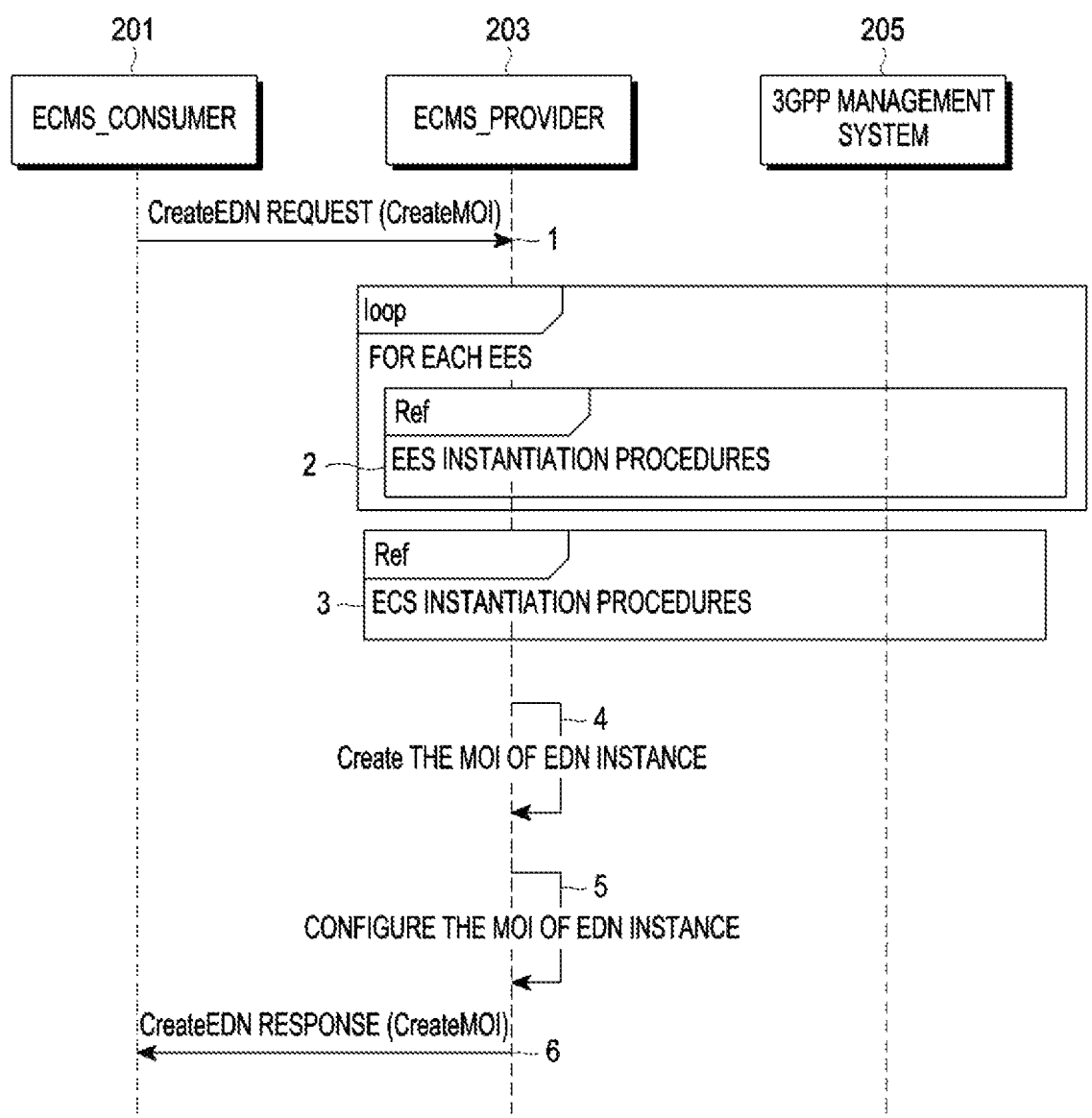
FIG. 2 illustrates a call flow diagram representing the procedures to deploy EDN, according to an embodiment of the present disclosure.

FIG. 2 illustrates a call flow diagram representing the procedures to deploy EDN, according to an embodiment of the present disclosure. According to said embodiment, all the constituent functions including EAS(s) 105, EES(s) 103 and Edge Configuration Server (ECS) 119 are instantiated. The deployment of the EDN 101 may be implemented in the EDGEAPP 100 for enabling edge computing as shown in FIG. 1 as disclosed above. In an example, the procedure is used by Operations Support System (OSS) entities to deploy readily available EDN 101 for future use.

At step 1: The Edge Computing Management Service Provider (ECMS_P) 203 receives a request to deploy EDN Instance Object Class (IOC) (this will use createMOI operation defined in 3GPP TS 28.532) from Edge Computing Management Service Consumer (ECMS_C) 201 with EDN related requirements. The operation createMOI is to deploy a Managed Object Instance (MOI) in the Management Information Base (MIB) maintained by the service provider 203. According to the present disclosure the ECMS_P 203 can be alternatively termed as ECMPS and the ECMS_C 201 can be alternatively termed as ECMSC without deviating from the scope of the present disclosure.

The EDN related requirements which is provided with the request as part of attributeListIn parameter of createMOI operation includes Serving Location and required Virtual Resources for the requested EDN. In an example, the Serving Location will provide the serving location of the EDN e.g. geolocation like longitude and latitude; access network defined for example a Cell IDs, Tracking Areas; a network defined for example a specific EDN(s), civic address and the like. In an example, required Virtual Resources may define the total virtual resources required in the EDN. This may include virtual compute, storage and networking resources.

The above EDN requirements will be defined as attributes of EDNFunction Information Object Class (IOC) on which the createMOI operation would act. The IOC may be defined as part of 5G Network Resource Model (NRM) in 3GPP TS 28.541 and further as shown in the table 1 above.

At step 2: For each EES, the ECMS_P 203 invokes Virtual Network Function (VNF) lifecycle management with requirements for VNF instance as descried in clause 4.2.2.2 in TS 28.526.

At step 3: For ECS, the ECMS_P 203 invokes VNF lifecycle management with requirements for VNF instance as descried in clause 4.2.2.2 in TS 28.526.

At step 4: The ECMS_P 203 deploys the MOI for EDNFunction class. The MOI shall contain the attributes as defined in EDNFuncton IOC above.

At step 5: The ECMS_P 203 configures the new deployed MOI with corresponding configuration information as per the information model definition for the proposed Edge specific NRM.

At step 6: The ECMS_P 203 sends the CreateEDN response (this will use createMOI operation defined in 3GPP TS 28.532) to ECMS_C with identifier of MOI and with identifier of ECMS_P 203 which actually maintains the MOI for EDN instance.

Figure 3:
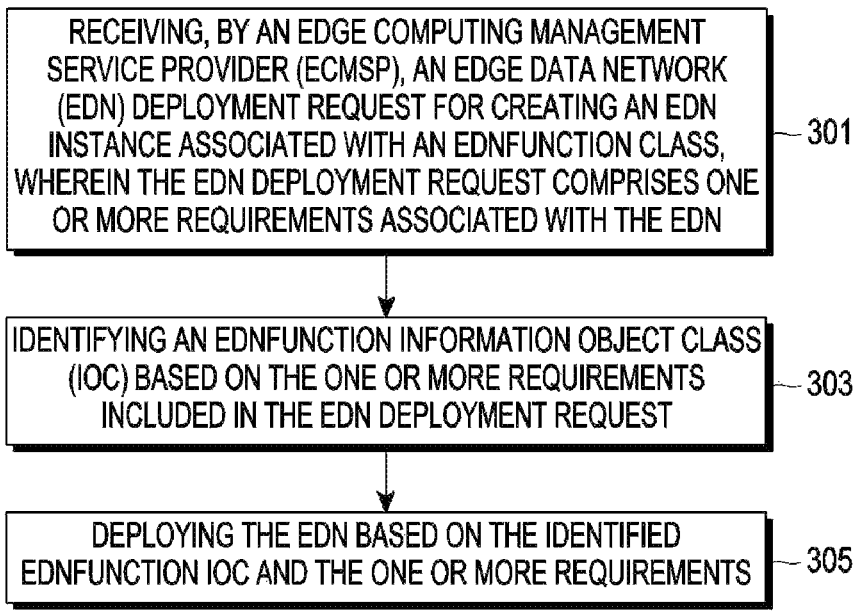
FIG. 3 illustrates a flow diagram for the deployment of the EDN, according to an embodiment of the present disclosure.

FIG. 3 illustrates a flow diagram for the deployment of the EDN 101, according to an embodiment of the present disclosure. According to said embodiment, all the constituent functions including EAS(s) 105, EES(s) 103 and Edge Configuration Server (ECS) 119 are instantiated. The deployment of the EDN 101 may be implemented in the EDGEAPP 100 for enabling edge computing as shown in FIG. 1 and FIG. 2 as disclosed above. Further, for the sake of simplicity some the explanation as applicable has been omitted herein. Further for the ease of explanation same reference numerals has been used in the forthcoming paragraphs. The method 300 includes the following steps.

At block 301, the method 300 initially performs receiving, by an Edge Computing Management Service Provider (ECMSP) 203, an Edge Data Network (EDN) deployment request for creating an EDN instance associated with an EDNFunction class. The Edge Data Network (EDN) deployment request for creating an EDN instance may be defied as createMOI. The EDN deployment request comprises one or more requirements associated with the EDN 101. The mechanism at the block 301 corresponds to the mechanism as explained in the step 1 of the FIG. 2.

Thereafter, at block 303, the method 300 further performs identifying an EDNfunction Information Object Class (IOC) based on the one or more requirements included in the EDN deployment request. The one or more requirements associated with a serving location of the EDN and a total virtual resources requirement for the requested EDN. The mechanism at the block 303 corresponds to the mechanism as explained in the step 1 of the FIG. 2.

In a further implementation, the method 300, after performing the method at block 303, performs obtaining one or more attributes associated with the identified EDNfunction IOC from the IOC database. The one or more attributes was explained in the step 1 of the FIG. 2.

In a yet further implementation, the method 300, performs invoking a VNF lifecycle management with a requirement for VNF instance for each Edge Enable server (EES) included in the EDN. The mechanism of invoking the VNF lifecycle management was explained in the step 2 of the FIG. 2.

In further implementation, the method 300, performs invoking a VNF lifecycle management with requirements for VNF instance for each Edge Configuration server (ECS). The mechanism of invoking the VNF lifecycle management was explained in the step 3 of the FIG. 2.

According to the further implementation, after the invoking the VNF lifecycle management for the corresponding EES and ECS, the method 300 further performs creating the Managed Object Instance (MOI) for the identified EDNfunction IOC based on the obtained plurality of attributes. The mechanism for creating the MOI was explained in the step 4 of the FIG. 2.

Now, after creation of the Managed Object Instance (MOI) for the identified EDNfunction IOC, the method 300 further performs configuring the created MOI corresponding to the request with configuration information. The configuration information is related to the EDN deployment request as per an information model definition for an edge specific Network Resource Model (NRM), and the configuration information is provided in EDN deployment request and contained within the within the EDN instance in the MOI. The mechanism for creating the MOI was explained in the step 5 of the FIG. 2.

According to the further implementation, the method 300 further performs transmitting a response, in response to creating a MOI for the identified EDNFunction IOC, along with an identifier associated with the MOI and another identifier associated with the ECSMP that maintains the MOI for the EDN instance. Thereby, at block 305, the method 300 further performs deploying the EDN 101 based on the identified EDNfunctionIOC and the one or more requirements. The aforementioned mechanism was explained in the step 6 of the FIG. 2.

Figure 4:
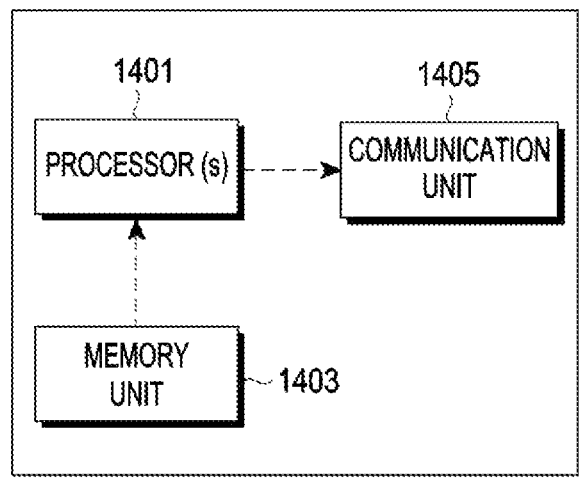
FIG. 4 illustrates another exemplary diagram of a source node, according to an embodiment of the present disclosure.

FIG. 4 illustrates another exemplary diagram of a network node 1400 in a wireless communication system according to an embodiment of the present disclosure. The network node 1400 may include a communication unit 1405 (e.g., communicator or communication interface), a memory unit 1403 (e.g., storage), and at least one processor 1401. Further, the network node 1400 may also include the Cloud-RAN (C-RAN), a Central Unit (CU), a core Network (NW), a Distributed unit (DU) or the any other possible network (NW) entity. The various examples of the network node is explained above therefore omitted here for the sake of brevity. The communication unit 1405 may perform functions for transmitting and receiving signals via a wireless channel.

In an example, the processor 1401 may be a single processing unit or a number of units, all of which could include multiple computing units. The processor 1401 may be implemented as one or more microprocessors, microcomputers, microcontrollers, digital signal processors, central processing units, state machines, logic circuitries, and/or any devices that manipulate signals based on operational instructions. Among other capabilities, the processor 1401 is configured to fetch and execute computer-readable instructions and data stored in the memory. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

The memory may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

Figure 5:
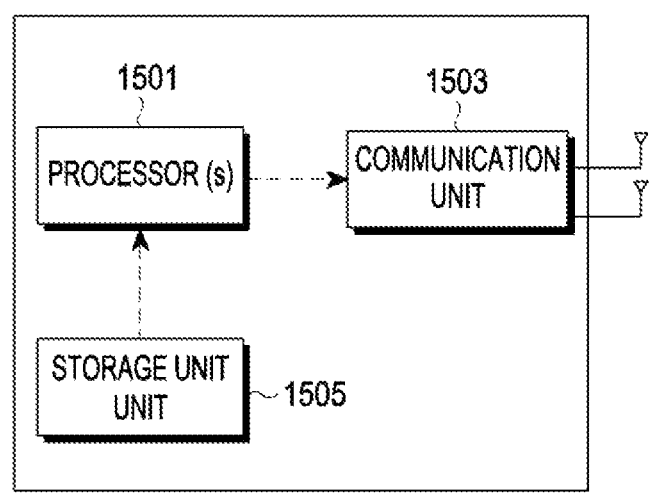
FIG. 5 is a diagram illustrating the configuration of a terminal 1500 in a wireless communication system, according to an embodiment of the present disclosure.

FIG. 5 is a diagram illustrating the configuration of a terminal 1500 in a wireless communication system according to an embodiment of the present disclosure. The configuration of FIG. 5 may be understood as a part of the configuration of the terminal 1500. Hereinafter, it is understood that terms including "unit" or "module" at the end may refer to the unit for processing at least one function or operation and may be implemented in hardware, software, or a combination of hardware and software.

Referring to FIG. 5, the terminal 1500 may include a communication unit 1503 (e.g., communicator or communication interface), a storage unit 1505 (e.g., storage), and at least one processor 1501. By way of example, the terminal 1500 may be a User Equipment, such as a cellular phone or other device that communicates over a plurality of cellular networks (such as a 3G, 4G, a 5G or pre-5G network or any future wireless communication network).

The communication unit 1503 may perform functions for transmitting and receiving signals via a wireless channel.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method for deploying an edge data network (EDN), the method comprising:
   receiving, by an edge computing management service provider (ECMSP) from an edge computing management service consumer (ECMSC), an edge data network (EDN) deployment request for creating an EDN instance associated with an EDNFunction class, wherein the EDN deployment request comprises one or more requirements associated with the EDN,
   identifying an EDNfunction information object class (IOC) based on the one or more requirements included in the EDN deployment request; and
   deploying the EDN based on the identified EDNfunction IOC and the one or more requirements,
   wherein the deploying comprises:
   invoking a virtual network function (VNF) lifecycle management with requirements for VNF instance corresponding to each edge enable server (EES) included in the EDN and each edge configuration server (ECS);
   creating a managed object instance (MOI) for the identified EDNfunction IOC based on a plurality of attributes associated with the identified EDNfunction IOC; and
   transmitting, to the ECMSC, a response including an identifier associated with the created MOI and an identifier associated with the ECMSP that maintains the created MOI for the EDN instance.

2. The method of claim 1, further comprising:
obtaining the plurality of attributes associated with the identified EDNfunction IOC from an IOC database.

3. The method of claim 1, wherein the one or more requirements include a serving location of the EDN and a total virtual resources requirement for the requested EDN.

4. The method of claim 3, wherein the serving location includes at least one of a geolocation of the EDN, an access network defined as a cell ID or a tracking area, a network defined as a specific EDN, or a civic address, and
wherein the total virtual resources requirement includes at least one of a virtual computing resource, a storage resource, or a networking resource.

5. The method of claim 1, further comprising:
configuring the created MOI corresponding to the request with configuration information.

6. The method of claim 5, wherein the configuration information is related to the EDN deployment request as per an information model definition for an edge specific network resource model (NRM).

7. The method of claim 5, wherein the configuration information is provided in EDN deployment request and contained within the EDN instance in the MOI.

8. The method of claim 1, wherein the plurality of attributes include at least one of PLMN ID list, NSSAI list, a serving location for the EDN, a virtual resource capacity information available in the EDN, and
wherein the virtual resource capacity information includes an EESFunction IOC defining at least one EES available in the EDN, and an EASFunction IOC defining at least one EAS available in the EDN.

9. A first network node of an edge computing management service provider (ECMSP) for deploying an edge data network (EDN), the first network node comprising:
a memory; and
a processor coupled with the memory, wherein the processor is configured to:
receive, from an edge computing management service consumer (ECMSC), an edge data network (EDN) deployment request for creating an EDN instance associated with an EDNFunction class from a second network node, wherein the EDN deployment request comprises one or more requirements associated with the EDN;
identify an EDNfunction information object class (IOC) based on the one or more requirements included in the EDN deployment request; and
deploy the EDN based on the identified EDNfunction IOC and the one or more requirements,
wherein the processor is further configured to:
invoke a virtual network function (VNF) lifecycle management with requirements for VNF instance corresponding to each edge enable server (EES) included in the EDN and each edge configuration server (ECS);
create a managed object instance (MOI) for the identified EDNfunction IOC based on a plurality of attributes associated with the identified EDNfunction IOC; and
transmit, to the ECMSC, a response including an identifier associated with the created MOI and an identifier associated with the ECMSP that maintains the created MOI for the EDN instance.

10. The first network node of claim 9, wherein the processor is further configured to:
obtain the plurality of attributes associated with the identified EDNfunction IOC from an IOC database.

11. The first network node of claim 9, wherein the one or more requirements include a serving location of the EDN and a total virtual resources requirement for the requested EDN.

12. The first network node of claim 9, wherein the processor is configured to:
configure the created MOI corresponding to the request with configuration information.

13. The first network node of claim 12, wherein the configuration information is related to the EDN deployment request as per an information model definition for an edge specific network resource model (NRM).

14. The first network node of claim 12, wherein the configuration information is provided in EDN deployment request and contained within the EDN instance in the MOI.

* * * * *